United States Patent
Haddock

(10) Patent No.: US 6,550,676 B2
(45) Date of Patent: Apr. 22, 2003

(54) HYBRID CARD CONTACT ACTUATOR SYSTEM AND METHOD

(75) Inventor: Richard M. Haddock, Redwood City, CA (US)

(73) Assignee: Drexler Technology Corporation, Mountain View, CA (US)

(*) Notice: Subject to any disclaimer, the term of this patent is extended or adjusted under 35 U.S.C. 154(b) by 0 days.

(21) Appl. No.: 10/010,695

(22) Filed: Dec. 5, 2001

(65) Prior Publication Data
US 2002/0153421 A1 Oct. 24, 2002

Related U.S. Application Data

(60) Provisional application No. 60/254,104, filed on Dec. 7, 2000.

(51) Int. Cl.$^7$ .................................................. G06K 7/00
(52) U.S. Cl. ........................ 235/440; 235/441; 235/475
(58) Field of Search .............................. 235/439, 440, 235/441, 454, 479, 492, 451, 475, 480

(56) References Cited

U.S. PATENT DOCUMENTS

| | | | |
|---|---|---|---|
| 4,230,939 A | 10/1980 | de Bont et al. | 235/488 |
| 4,269,917 A | 5/1981 | Drexler et al. | 430/16 |
| 4,278,756 A | 7/1981 | Bouldin et al. | 430/414 |
| 4,278,758 A | 7/1981 | Drexler et al. | 430/616 |
| 4,298,694 A | 11/1981 | Skov | 518/704 |
| 4,314,260 A | 2/1982 | Drexler | 346/76 L |
| 4,734,565 A | 3/1988 | Pierce et al. | 235/454 |
| 4,796,242 A | 1/1989 | Pierce | 369/32 |
| 5,122,643 A | 6/1992 | Gamou et al. | 235/384 |
| 5,317,138 A | 5/1994 | Togawa | 235/440 |
| 5,332,890 A | 7/1994 | Kitahara | 235/440 |
| 5,347,116 A * | 9/1994 | Saito et al. | 235/475 |
| 5,375,112 A | 12/1994 | Togawa | 369/15 |
| 5,744,792 A | 4/1998 | Imataki et al. | 235/492 |
| 5,917,177 A | 6/1999 | Owa et al. | 235/486 |
| 5,932,865 A | 8/1999 | Drexler | 235/487 |
| 6,163,091 A | 12/2000 | Wasson et al. | 310/12 |
| 6,199,761 B1 | 3/2001 | Drexler | 235/487 |
| 6,202,932 B1 | 3/2001 | Rapeli | 235/491 |
| 6,394,347 B1 * | 5/2002 | Kitai et al. | 235/435 |

* cited by examiner

Primary Examiner—Diane I. Lee
(74) Attorney, Agent, or Firm—Thomas Schneck; Gina McCarthy

(57) ABSTRACT

A system and method for transferring data between a read/write apparatus having a shuttle powered by a single motor supporting a hybrid data storage card and having optical and electrical data heads. The hybrid data storage card has an integrated circuit module and an optical memory unit both on a single side of the hybrid card. Electrical signal communication occurs when a gap between the shuttle and a support connected to the electrical head is closed such that the electrical head is able to align with the integrated circuit module. Optical signal communication occurs between the optical data head and optical memory unit when the gap is formed and maintained between the shuttle and the support connected to the electrical head such that the shuttle is able to move linearly without interference from the support.

32 Claims, 3 Drawing Sheets

HYBRID CARD CONTACT ACTUATOR SYSTEM AND METHOD

CROSS REFERENCE TO RELATED APPLICATION

This application claims the benefit and priority of U.S. provisional application No. 60/254,104, filed Dec. 7, 2000, which is hereby incorporated by reference.

TECHNICAL FIELD

This invention relates in general to a read/write system and method and more particularly to such a system and method adapted to provide reading and writing access to data on hybrid memory cards that contain both optical and IC chip media as memory elements on the same side of the card.

BACKGROUND ART

Information industries have rapidly developed as amounts of information in need of access have increased. In part due to this, hybrid cards, having both an optical memory unit and an integrated circuit (IC) module for storing information, are widely used. In one type of hybrid card, the IC module and the optical memory unit are located on opposite sides of the hybrid card. Hardware has been developed that allows for access to both sides of the card to read/write information. However, such hardware can be complex and costly to manufacture.

In more recent commercial applications, the optical memory unit and the IC module have been located on a same side of the hybrid card. Therefore, the hardware used to perform the read/write operations must be capable of accessing the optical memory unit and the IC module present on the same side. Such devices are often costly and incorporate multiple motors and/or pulleys in order to access the information. A market need is to decrease the size and the cost of such an apparatus.

Therefore, it is an object of the present invention to provide a system and method for transferring optical and electrical data to and from a hybrid card that is compact, lightweight and low cost.

It is a further object of the invention to provide a new and improved system and method for transferring optical and electrical data to and from a hybrid card.

SUMMARY OF THE INVENTION

The above objects have been met with a system and method for transferring data between a read/write apparatus having a single motor and a hybrid data storage card with an IC module and an optical memory unit, both on a single side of the hybrid card.

The system includes a read/write apparatus having a shuttle. The shuttle has a planar surface upon which the hybrid card rests. A single motor is coupled to the shuttle for moving the card in a direction parallel to an optical information strip found on the hybrid card. The motor includes for example, a linear motor. As the card is moved, an optical head unit is able to read/write data present on the optical memory unit of the hybrid card.

Subsequent or prior to data transfer between the optical head and optical memory unit on the hybrid card, the shuttle moves the card to a contact or stop position. When the card is shuttled to the contact position a gap, present between the shuttle supporting the card and the support connected to the electrical head, is closed. The contact position allows contact between the integrated circuit module and an electrical head coupled to the support. The electrical head contacts the integrated circuit module on the hybrid card in such a manner that allows for reading and/or writing information.

When the card is shuttled away from the contact position the gap between the support and the shuttle is formed and the support is in a retracted position. In this position, a non-contact position, the shuttle supporting the card is moved thereby moving the card in a direction parallel to the optical memory unit so that the optical head unit is able to perform read/write functions.

There are thus two modes of operation of the motor that drives the card shuttle, i.e. an optical data access mode and an IC chip data access mode. In one mode of operation, the card shuttle reciprocates back and forth beneath the optical head thereby providing access by the optical head to the data on the optical strip.

In another mode of operation the motor moves the card shuttle to a stop or contact position which allows the electrical head to make contact with the integrated circuit module on the outside of the chip. Because the electrical head is basically fixed relative to the optical head, albeit allowed to pivot between retracted and chip-engaging positions and does not move with the reciprocating card in the other mode, interference between the electrical head and the optical head can easily be avoided. A single motor, i.e. the card's shuttle drive motor controls the data access by the optical head and electrical head in separate modes of operation. Both modes of operation can be completed successively within one second of time.

BEST MODE FOR CARRYING OUT THE INVENTION

Figure 1:
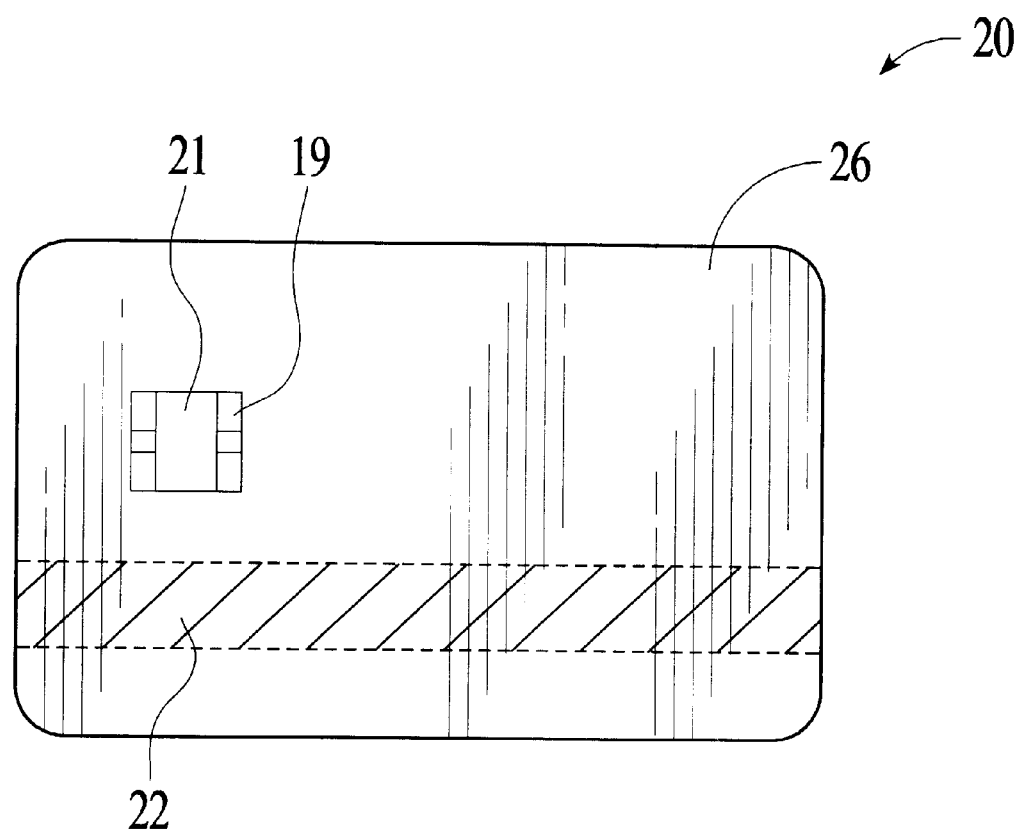
FIG. 1 is a plan view of a hybrid card of the system of the present invention.

Pictured in FIG. 1 is a hybrid data storage card 20 for use with the system of present invention. The card 20 has a first surface or side 26 and a second surface or side (not shown) opposite to the first surface 26. The hybrid card 20 has both an integrated circuit (IC) module (semiconductor memory unit) 21 and an optical memory strip or unit 22 on the first surface 26.

The IC module 21, known in the art, is typically 85×53× 0.8 mm in size, and includes an integrated circuit (IC) chip with a number of electrical contact pads 19. The IC chip includes a microprocessor which is capable of storing information and communicating with the outside world by means of the electrical contacts provided on the card.

The optical memory strip 22 includes data, having optically written information such as data tracks therein (not shown). U.S. Pat. No. 5,932,865 to Drexler, which is hereby incorporated by reference, describes a laser writing apparatus. The apparatus is used to form microscopic data spots in the field of a reflective layer altering the reflectivity in the data spot. Laser data spots are written at designated locations within a data track. After a laser beam is used to write data at one site, the beam is moved to the next site.

The strip 22 is typically 16 mm wide and extends the length of the card. Alternatively, the strip may have other sizes and orientations. The strip is relatively thin, typically 60–200 microns, although this is not critical. The strip 22 is adhered to the card 20 with an adhesive. A high resolution laser recording material forms the strip 22. The material may be any of the reflective recording materials which have been developed for use as direct-read-after-write (DRAW) optical disks, so long as this material can be formed on the card 20. An example of a high resolution material is described in U.S. Pat. No. 4,230,939 issued to de Bont, et al. Typical recording media are also described in U.S. Pat. Nos. 4,314,260; 4,298,694; 4,278,758; 4,278,756; 4,269,917; and 6,199,761.

Figure 2:
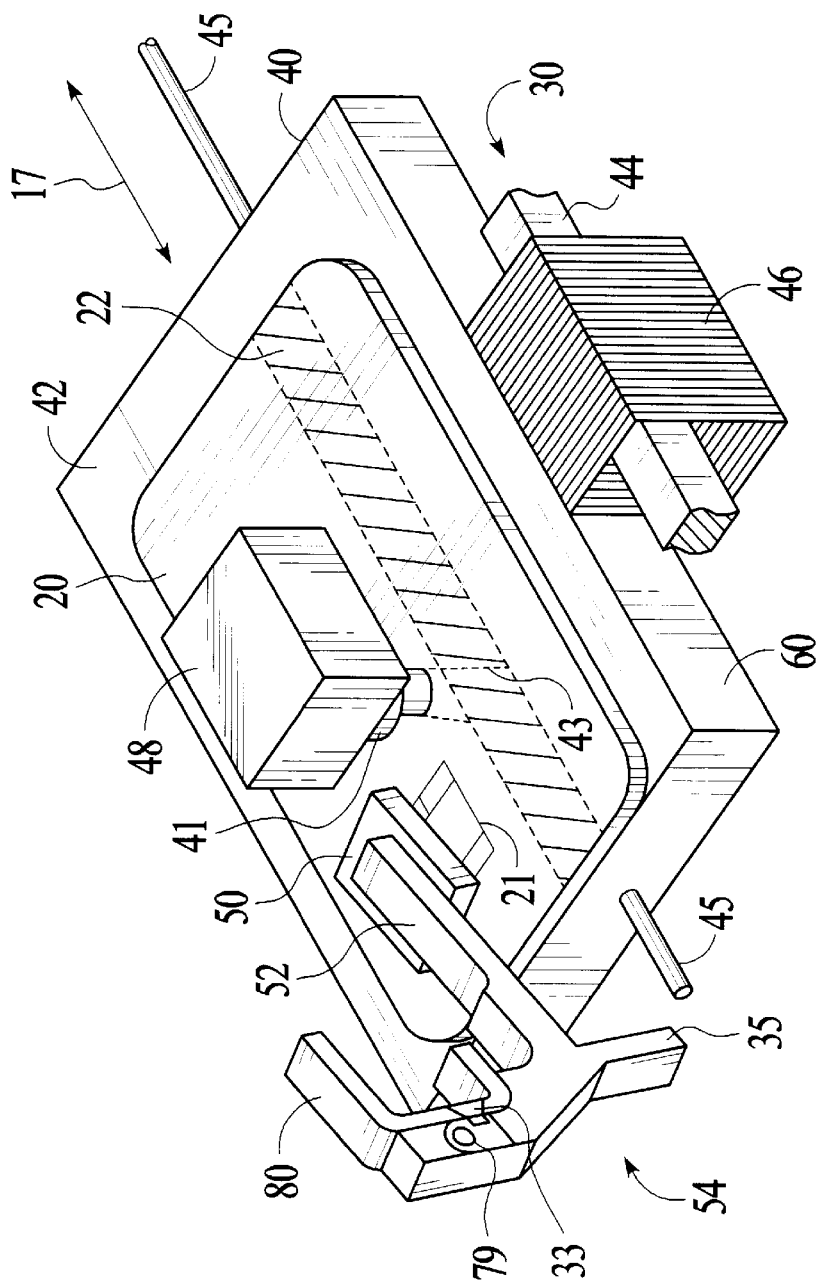
FIG. 2 is a perspective view of the system of the present invention.

With reference to FIG. 2, the system of the present invention is seen featuring a linearly moving shuttle 40. The shuttle 40 has opposed sides with a planar surface 42 in between for supporting the hybrid card 20. The shuttle is adapted to receive and securely support the hybrid card 20 such that the card is secured in a fixed position relative to the shuttle 40. For example, a set of two or more steps on the shuttle 40 will position the card 20 accurately in the shuttle 40 in a repeatable manner. This is important because contact pads 19 on the IC module 21 are typically only 1.5 to 2.0 mm square and contacts 47 for electronic head 50 (pictured in FIG. 3B) need to hit the same data access positions every time. A single motor 30 moves the shuttle 40 and the card 20 on it in a direction parallel to the optical memory strip 22 found on the card 20.

The motor 30 is, for example, a linear motor 30 known in the art. On a side wall 60 of the shuttle there is secured a coil 46 through which a permanent magnet or magnet array 44 is inserted to constitute the linear motor 30. The linear motor generates electromagnetic forces on the coil in cooperation with the magnet when a driving current is supplied to the coil 46. The shuttle 40 connected to the coil 46 is propelled by the linear motor 30 as the coil travels along the length of the shuttle 40 and the magnet remains stationary. Alternative linear motor arrangements known in the art may be used to propel the shuttle 40. The single motor may be comprise a stepper motor or another type of motor known in the art.

Figure 3A:
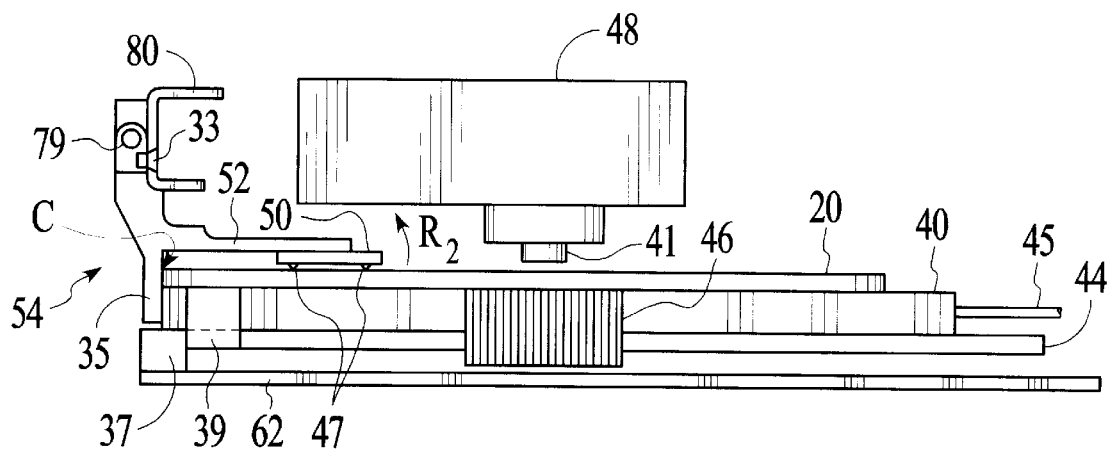
FIG. 3A is a side plan view of the system of the present invention in a contact position.

The motor 30 is responsive to programmed commands from a combination of firmware and software to operate in a first optical read/write mode of operation (FIGS. 2 and 3B) and a second IC module read/write mode of operation (FIG. 3A). In the first mode of operation, the motor 30 causes the card shuttle 40 with the card 20 to reciprocate 17 in the lengthwise direction of the card. In the second mode of operation, the motor 30 moves the card shuttle 40 with the card 20 to a fixed stop position.

The shuttle is slidably engaged by a rod 45 parallel to the optical memory strip 29 on card 20. The rod 45 is inserted through an opening along the length of the shuttle and guides the moveable shuttle 40 in a direction along the length of the optical memory strip 22 as a current is supplied to the motor 30.

Above the shuttle 40 there is arranged an optical head 48 containing optical elements (lenses, etc.) 41 for projecting reading and writing light beams 43 for use with the optical memory strip 22. The optical head, comprising a laser diode and steering optics is known in the art. The optical head 48 is movable in a transverse direction across the width of the optical strip 22 on the card 20 orthogonal to the longitudinal reciprocating direction 17 of card 20 and shuttle 40 motion. As the card 20 (on the shuttle 40) is moved or reciprocates, optical signal communication takes place. The optical head unit 48 is able to read/write data in the form of data spots on optical tracks of the memory strip 22 of hybrid card 20. As light is scattered and reflected from data spots in the laser recording material, the percentage of reflected light from the incident beam changes relative to the surrounding material where no sports exists. Optical hardware and software known in the art is used to detect the differences in reflectivity between a data spot and surrounding material. Data access to the optical strip 22 on the card 20 by the optical head 48 is thus available in the first mode of operation while the card reciprocates 17.

Arranged to the side of the shuttle 40 is an electrical head 50 or chip contactor for both reading information from and writing information to the IC module 21 of the optical memory card 20. The electrical head 50 is known in the art. Contact terminals 47 for contact with the IC module 21, are present within the electrical head 50 and allow for reading and/or writing information. Electrical contact between the electrical head 50 and the IC module 21 allows electrical signal communication and make possible the reading/writing operations from/to the IC module 21.

In FIG. 2 it is seen that the shuttle 40 is not contacting support 54 and optical head 48 is optically communicating with optical memory unit 22 so that read/write functions may occur. Subsequent or prior to data transfer between the optical head 48 and the information strip 22 on the hybrid card, the shuttle 40 moves to a contact position C (pictured in FIG. 3A). In the contact position C, or fixed stop position, the shuttle 40 contacts support 54 allowing for alignment of and contact between the integrated circuit module 21 (seen in FIGS. 1 and 2) and the electrical head 50.

In FIG. 3A it is seen that the electrical head 50 is connected to retractably pivotable support 54 at one end of the shuttle through an arm portion 52. The support 54 has a pivot point and is pivoted about a pin 79 mounted to a fixing member 80, such as a C-shaped bracket that is a part of the fixed mounting assembly (not shown) for the optical head 48 and other fixed components (circuit boards, etc.) of the reader/writer apparatus. A torsional spring partially seen at 33 holds the support 54 in the retracted position seen in FIG. 3B until the card shuttle 40 pushes against the support 54 as seen in FIG. 3A. The spring 33 likewise returns the support 54 to the retracted position of FIG. 3B when the card shuttle 40 moves away from the fixed position of FIG. 3A. To facilitate pivoting of the support 54 a downwardly projecting finger 35 is in a position for the card shuttle 40 to engage the finger 35. A rubber bumper 37 fixed on a part of the apparatus, such as frame 62, is contacted by a bumper 39 attached to the shuttle 40 at the contact position C. This contact protects the support 54 from overpushing by the motor operated card shuttle 40. Thus, to get to the contact position, the electrical head 50 is moved in a clockwise direction (direction of arrow $R_1$) as the support rotates about the pivot pin 79. When the electrical head 50 contacts the IC module 21, electrical signal communication occurs.

Figure 3B:
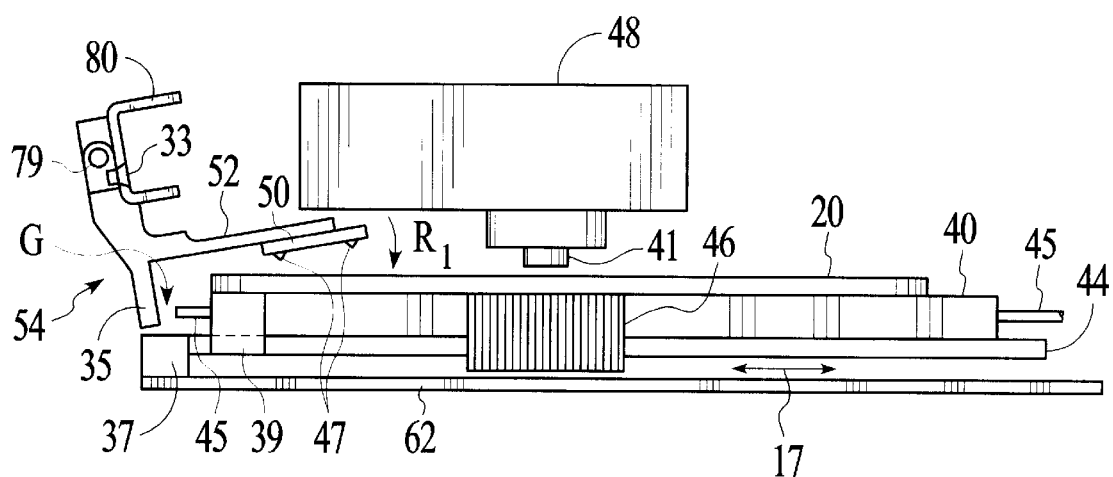
FIG. 3B is a side plan view of the system of the present invention in a non-contact position.

Turning to the modes of operation with reference to FIGS. 3A and 3B, in one mode of operation, the card is shuttled to the contact position C in response to a read chip command through the use of motor 30 closing a gap G (FIG. 3B) present between the shuttle 40 supporting the card 20 and the support 54 connected to electrical head 50. The contact or fixed stop position is about an extra 2 mm backward beyond the normal limit of reciprocation of the optical communication mode of operation. As the shuttle 40 moves to the contact position C (FIG. 3A) it engages projecting finger 35 of the support 54 and pushes it backwards. This causes the support 54 to pivot about pivot pin 79, in the direction indicated by arrow $R_1$. This in turn causes the arm position 52 of the support 54 (which extends forward beneath the optical head 48 at an approximately right angle to an imaginary line between pivot pin 79 and projecting finger 35) to move downward as indicated by arrow $R_1$, so that the contacts 47 (adapted for reading and writing data in the IC module) make good contact with the contact pads 19 on the card's IC module 21 as shown in FIG. 3A. The drive motor 30 ensures that the contacts 47 connect with the pads 19 with sufficient force for proper reading of data, while the bumpers 37 and 39 prevent overpushing.

After the data has been read from the chip 21, a release chip command causes the motor to move the card shuttle 40 forward away from the support 54. The torsional spring 33 around pivot pin 79 causes the support 54 to retract back to the position seen in FIG. 3B, thereby releasing the contacts 47 from the IC module 21. The total movement distance of the contact 47 from the retracted position to the chip engaging position (or vice versa) is about 2 mm to 3 mm. The total thickness of the support arm 52, head 50 and mounted contact elements 47 is only about 3 mm. The clearance between the IC module 21 on the card and the underside of the optical head 48 in the vicinity of the support is about 7 mm.

After data has been transferred between the IC module 21 and the electrical head 50, the support 54 is rotated about pivot pin 79 in a counter-clockwise direction (direction of arrow $R_2$) as shown in FIG. 3A and the electrical head 50 is lifted away from the IC module 21. Next, the shuttle moves away from the support 54 along rod 45 resulting in a non-contact position having a gap G pictured in FIG. 3B between the shuttle 40 and the support 54. The motor 30 causes the card shuttle 40 with the card 20 to reciprocate 17 beneath the optical head 48. In this position, optical data can be transferred between the optical memory unit 22 and the optical head 48 by methods known in the art. There is a normal limit of reciprocation such that there is always a gap G between the back edge of the card shuttle 40 and the projecting finger 35 of the support 54. Thus, the support 54 is not engaged by the shuttle and remains by means of spring 33 in a retracted position with the contacts 47 mounted on head 50 and arm 52 being spaced apart from the card 20 near the underside of the optical head 48 where it cannot interfere optically with the optical reading by the optics 41 of the head 48 nor interfere mechanically with the movement of the card 20.

Computer control means such as servo control means monitor and control when the system is in a contact or non-contact position, when one type of data has been transferred and when the other type of data should be transferred. For example, data from the optical memory strip 22 and the optical head 48 is transferred between the strip and head when the shuttle 40 has been moved away from the support 54 and the gap G is present between the support 54 and shuttle 40. After optical electrical communication has occurred computer control means move the shuttle to the contact position. Data from the IC module 21 and the electrical head 50 is then transferred between the IC module and head after the shuttle 40 has been moved to contact the support 54 and the gap G between the support 54 and shuttle 40 is closed. Such a system allows alternative transfer of data between the optical head 48 and optical memory unit 22 and between the electrical head 50 and IC module unit 21 with the use of a single motor. The order in which the optical data or electrical data may be transferred is not critical. Data transfer is sequential and either optical or electrical data transfer can occur first.

It is advantageous that data transfer between optical memory strip 22 and optical head 50 and IC module 21 and electrical head 50 is actuated with use of a single motor as such a system is lightweight, easier to manufacture and less costly than other systems.

What is claimed is:

1. A system for transferring data between optical and electrical data heads and a hybrid data storage card having optically and electrically written stored data comprising:

a hybrid data card having a semiconductor memory unit and an optical memory unit, both memory units on a single side of said data card; an electrical data head moveable into electrical signal communication with said semiconductor memory unit and an optical data head moveable into optical signal communication with the optical memory unit of said hybrid card; and a shuttle, spaced apart from said electrical data head, and adapted to receive and support said hybrid data card, said shuttle having a single motor for positioning said shuttle with said data card for data transfer between said semiconductor memory unit and said electrical data head and for reciprocating said hybrid data card supported by said shuttle for data transfer between said optical memory unit and said optical data head, wherein said electrical and optical data transfer occurs sequentially.

2. The system of claim 1 wherein said electrical head is connected to a support.

3. The system of claim 2 wherein said support includes a pivot.

4. The system of claim 2 wherein said shuttle and said support are in contact during electrical signal communication.

5. The system of claim 2 wherein said support includes an arm connecting said electrical head and said support.

6. The system of claim 2 wherein a gap is present between said shuttle and said support during optical signal communication.

7. The system of claim 1 wherein said electrical head has contact terminals contacting said semiconductor memory unit during electrical signal communication.

8. The system of claim 1 further comprising a rod located in an opening in said shuttle.

9. A method for alternating between data transfer occurring between a card having a semiconductor memory unit and an optical memory unit and electrical and optical data heads, wherein said electrical data head includes a support and said card is supported by a shuttle powered by a single motor and moveable between said heads, comprising:

moving said shuttle into a contact position with said support, closing a gap between said shuttle and support;

effecting electrical signal communication between said semiconductor memory unit and said electrical data head;

moving said shuttle away from said support, forming a gap between said support and said shuttle; and effecting optical signal communication between said optical memory unit and said optical head while reciprocating said card.

10. The method of claim 9 wherein effecting electrical communication includes rotating said support in one direction and lowering said electrical head.

11. The method of claim 10 further comprising rotating said support in another direction after electrical communication occurs.

12. The method of claim 9 wherein effecting electrical signal communication includes contacting said electrical head with said semiconductor memory unit.

13. The method of claim 9 further comprising the step of lifting said electrical data head from said semiconductor memory unit before moving said shuttle away from said support.

14. The method of claim 9 further comprising lowering said electrical head into contact with said semiconductor memory unit after moving said shuttle into a contact position with said support.

15. The method of claim 9 wherein said electrical signal communication occurs before said optical signal communication.

16. The method of claim 9 wherein said optical signal communication occurs before said electrical signal communication.

17. The method of claim 9 wherein said optical signal communication and said electrical signal communication occur sequentially.

18. The method of claim 9 wherein said electrical signal communication occurs only when said shuttle is in a contact position with said support.

19. The method of claim 9 wherein said optical signal communication occurs only when said gap is present between said shuttle and said support.

20. A hybrid memory card reader/writer apparatus, comprising:
   a movable card shuttle adapted to receive and securely support a hybrid memory card having an optical memory element and IC chip memory element on the same side, the card being securely supported in fixed relation to the movable card shuttle;
   an optical head adapted for reading and writing access to data in said optical memory element of said card;
   a chip contactor adapted for reading and writing access to data in said IC chip memory element of said card, the chip contactor having one or more contacts mounted on a support, the support having a projecting finger engageable by the movable card shuttle whereby the support can retractably pivot to engage the contacts with the IC chip memory element of the card; and
   a linear motor adapted to drive the movable card shuttle in response to programmed commands in a first mode providing data access of the optical head to the optical memory element of the card and in a second mode providing data access of the chip contactor to the IC chip memory element of the card, the motor in said first mode reciprocably driving the card shuttle with said card relative to said optical head, the motor in said second mode moving the card shuttle beyond a limit of reciprocable motion of the first mode to a stop position engaging said card shuttle with said projecting finger of said support such that the contacts of the chip contactor mounted on the support engage data access positions of the IC chip memory element of the card.

21. The apparatus of claim 20 wherein said optical head is movable in a direction across the card supported on the shuttle orthogonal to the reciprocal motion of the card shuttle.

22. The apparatus of claim 20 wherein both said first mode and said second mode provide complete data access to data in both said optical memory element of the card and said IC chip memory element of the card within one second of time.

23. The apparatus of claim 20 wherein said card shuttle includes a bumper that makes contact with a fixed bumper of the apparatus at said stop position of the shuttle.

24. The apparatus of claim 20 wherein said retractably pivoting support includes a pin connecting the support to its pivot point with a torsional spring around said pin engaging said support to release and retract said contacts from the IC chip memory element of the card whenever the card shuttle moves away from said stop position and ceases to engage the projecting finger of the support.

25. The apparatus of claim 20 wherein said contacts of said chip contactor are mounted on an arm of said support that extends beneath said optical head, the optical head having a clearance with respect to the card shuttle that accommodates pivoting retraction of said support.

26. A method by which a hybrid memory card reader/writer apparatus uses a single motor to control data access to either optical media or IC chip media located on the same side of said hybrid card, the method comprising:
   receiving the hybrid memory card in a movable card shuttle, the card being securely supported in fixed relation to the movable card shuttle;
   driving the card shuttle with a linear motor according to either or successively both of two modes of operation responsive to programmed commands, the motor in a first mode of operation reciprocably driving the card shuttle with said card relative to an optical head such that the optical head has reading and writing access to data in the optical media on said card, the motor in a second mode of operation moving the card shuttle beyond a limit of reciprocable motion of the first mode to a stop position such that the card shuttle engages a projecting finger of a retractably pivoting support on which support is mounted a chip contactor having one or more contacts, motion of said card shuttle in said second mode of operation to said stop position causing the finger to pivot the support such that the contacts of the chip contactor engage data access positions of the IC chip media on the card.

27. The method of claim 26 wherein said optical head moves in a direction across the card supported on the shuttle orthogonal to the reciprocal motion of the card shuttle in the first mode of operation.

28. The method of claim 26 wherein both modes of operation are successively completed and data access to both the optical media and the IC chip media achieved within one second of time.

29. The method of claim 26 wherein at the completion of the second mode of operation the motor moves the card shuttle away from the stop position and the shuttle ceases to engage the projecting finger of the support such that the support retracts and releases the contacts of the chip contactor away from the IC chip media of the card.

30. A system for transferring data between optical and electrical data heads and a hybrid data storage card having optically and electrically written stored data comprising:
   a hybrid data card having a semiconductor memory unit and an optical memory unit, both memory units on a single side of said data card;
   an electrical data head connected to a support and moveable into electrical signal communication with said semiconductor memory unit and an optical data head moveable into optical signal communication with the optical memory unit of said hybrid card; and
   a shuttle having a single motor for positioning said data card for sequential data transfer between said semiconductor memory unit and said electrical data head and between said optical memory unit and said optical data head, wherein said shuttle and said support are in contact during electrical signal communication.

31. A method for alternating between data transfer occurring between a card having a semiconductor memory unit and an optical memory unit and electrical and optical data heads, wherein said electrical data head includes a support and said card is supported by a shuttle powered by a single motor and moveable between said heads, comprising:

moving said shuttle into a contact position with said support, closing a gap between said shuttle and support;

effecting electrical signal communication between said semiconductor memory unit and said electrical data head;

moving said shuttle away from said support, forming a gap between said support and said shuttle, and lifting said electrical data head from said semiconductor memory unit before moving said shuttle away from said support; and effecting optical signal communication between said optical memory unit and said optical head.

32. A method for alternating between data transfer occurring between a card having a semiconductor memory unit and an optical memory unit and electrical and optical data heads, wherein said electrical data head includes a support and said card is supported by a shuttle powered by a single motor and moveable between said heads, comprising:

moving said shuttle into a contact position with said support, closing a gap between said shuttle and support;

effecting electrical signal communication between said semiconductor memory unit and said electrical data head wherein said electrical signal communication occurs only when said shuttle is in a contact position with said support;

moving said shuttle away from said support, forming a gap between said support and said shuttle; and effecting optical signal communication between said optical memory unit and said optical head.

* * * * *